United States Patent [19]

Gill et al.

[11] 4,270,591
[45] Jun. 2, 1981

[54] FASTENER ASSEMBLY

[75] Inventors: Donald H. Gill, St. Clair Shores; Joseph A. MacRae, Troy; Compton J. Cottrill, Sterling Heights, all of Mich.

[73] Assignee: General Motors Corporation, Detroit, Mich.

[21] Appl. No.: 25,288

[22] Filed: Mar. 29, 1979

[51] Int. Cl.³ ............................................. F16B 39/00
[52] U.S. Cl. ................................... 411/112; 403/299; 411/523; 411/103
[58] Field of Search .................... 151/41.75; 85/36; 403/299

[56] References Cited

U.S. PATENT DOCUMENTS

| | | | |
|---|---|---|---|
| 2,222,449 | 11/1940 | Tinnerman | 151/41.75 |
| 2,286,042 | 6/1942 | Tinnerman | 151/41.75 |
| 2,704,680 | 3/1955 | Bedford, Jr. | 403/299 |

FOREIGN PATENT DOCUMENTS

| | | |
|---|---|---|
| 536176 | 5/1941 | United Kingdom . |
| 537644 | 6/1941 | United Kingdom . |
| 659926 | 10/1951 | United Kingdom . |
| 661583 | 11/1951 | United Kingdom . |

Primary Examiner—Casmir A. Nunberg
Attorney, Agent, or Firm—Arthur N. Krein

[57] ABSTRACT

A fastener assembly for blind assembly to a support panel includes a bolt retained in one leg of a pair of spaced apart legs of an attaching clip so that a leg having the bolt secured thereto can be inserted through a T-slot in the support panel. The spaced apart legs of the attaching clip firmly grip opposite sides of the support panel to provide improved retention of the fastener assembly to the support panel with the one leg providing additional support for the head of the bolt on the blind side of the support panel.

2 Claims, 6 Drawing Figures

FASTENER ASSEMBLY

FIELD OF THE INVENTION

This invention relates to fastener assemblies and, in particular, to a two-piece fastener assembly which is adapted for blind attachment to a support panel.

DESCRIPTION OF THE PRIOR ART

In the assembly of certain vehicle components to a support panel, it is necessary to use a blind fastener that can be easily and economically attached to the support panel from the exposed side thereof. One such blind fastener commonly used in certain applications is of the type disclosed in U.S. Pat. No. 2,704,680 entitled "Fastening Device" issued Mar. 22, 1955 to William A. Bedford, Jr. This type of blind fastening device includes a headed bolt secured to an attaching clip whereby the bolt can be fixed by the attaching clip to an apertured support panel of a predetermined thickness.

SUMMARY OF THE INVENTION

The primary object of this invention is to provide an improved fastener assembly for blind application to an apertured support panel whereby the attaching clip for a headed bolt provides for improved retention of both the bolt and attaching clip to the support panel.

Another object of this invention is to provide an improved fastener assembly for blind application to an apertured support panel whereby the attaching clip for a threaded bolt to be secured to the panel provides increased support under the head of the bolt to prevent the head from pulling through the support panel.

A further object of this invention is to provide an improved fastener assembly for blind application to an apertured support panel whereby the attaching clip for a headed bolt can be used with support panels of varying thicknesses over a predetermined range of panel thickness.

For a better understanding of the invention as well as other objects and further features thereof, reference is had to the following detailed description of the invention to be read in connection with the accompanying drawings.

DESCRIPTION OF THE EMBODIMENTS

Figure 1:
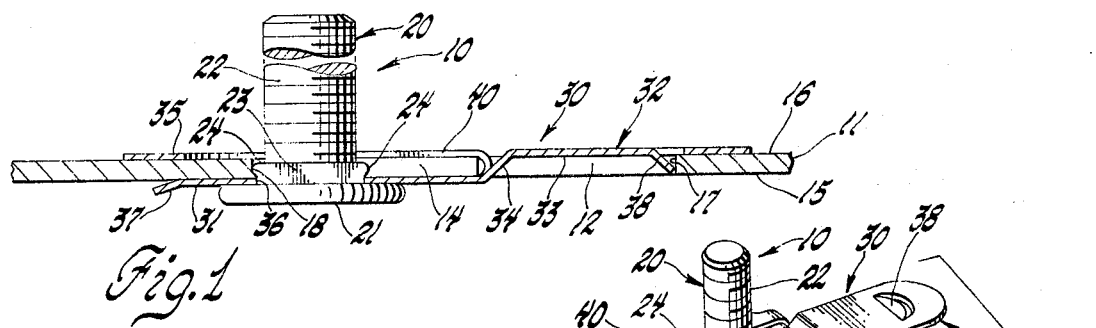
FIG. 1 is a side elevational view of a portion of a support panel, as for part of a vehicle body, having a fastener assembly, in accordance with a preferred embodiment of the invention, secured thereto.
Figure 2:
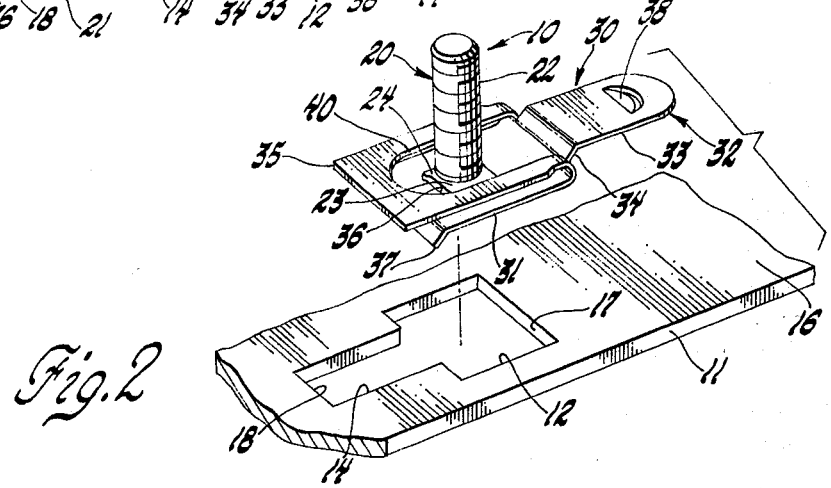
FIG. 2 is an exploded, perspective view showing the fastener assembly of FIG. 1 in position for assembly to a support panel to obtain the assembly shown in FIG. 1.

Referring first to FIGS. 1 and 2, there is illustrated a fastener assembly 10 which is adapted to be secured to a support panel 11 so as to provide the assembly shown in FIG. 1.

Support panel 11, only a portion of which is shown, may be, for example, a component of a vehicle body assembly to which another component is to be attached. As best seen in FIG. 2, the support panel 11 is provided with a suitable aperture 12, which in the embodiment illustrated, is of substantially square configuration, and a slot 14 connecting to the aperture, to define a keyhole shaped opening. The support panel 11, as used in a vehicle body, would have a blind, lower surface 15, with reference to the FIGS. 1 and 2, and an upper surface 16 that would be accessible to an assembler.

Fastener assembly 10 includes a bolt 20 and an attaching clip 30, with the bolt 20 being suitably secured to the attaching clip 30, as for example in the manner to be described, whereby to provide for a unit assembly of these two elements.

Bolt 20 has a head 21 with an externally threaded shank 22 extending therefrom, as shown in FIG. 1. In the embodiment illustrated, bolt 20 is also provided with a square shoulder 23 disposed on the shank between its threaded shank 22 portion and the head 21. The distance between the flats of the shoulder 23 is less than the outside diameter of the head 21 and greater than the outside diameter of the threaded shank 22.

Figure 3:
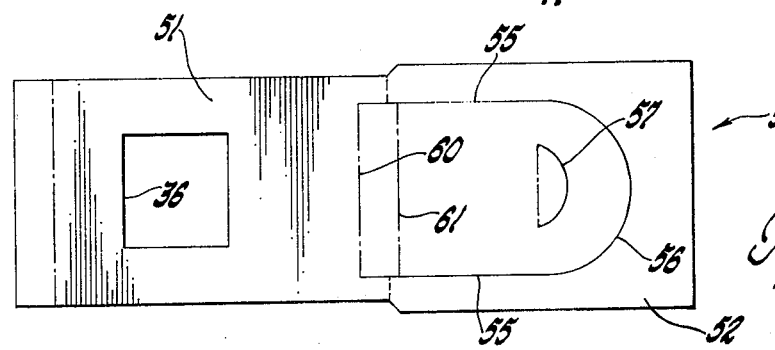
FIG. 3 is a top view of a sheet metal blank from which the attaching clip per se of the fastener assembly of FIGS. 1 and 2 is fabricated.
Figure 4:
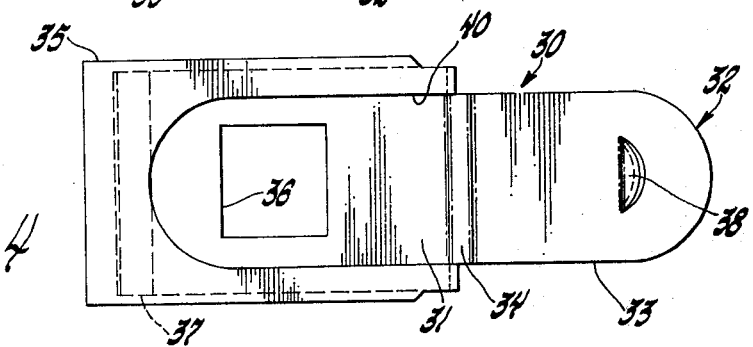
FIG. 4 is a top plan view of the attaching clip per se of the fastener assembly in accordance with the invention.

As best seen in FIGS. 1, 3 and 4, the shoulder 23 is of a predetermined axial extent and is provided with stop members 24 at the end thereof opposite the head 21 for a purpose which will become apparent, four such stop members 24 being shown in the embodiment illustrated. The outside diameter of the head 21 of the bolt 20 is greater than the width of the slot 14 but substantially smaller than aperture 12 to permit insertion of the bolt head 21 therethrough. As will be apparent, at least the shank portion of the bolt next adjacent to the head 21 is appropriately sized so as to be slidably received in the slot 14. In the construction shown, this portion would be the shoulder 23 which is sized so that opposed flats thereof will be received in the slot 14 in a manner to assist in preventing rotation of the bolt 20 relative to the support panel 11 as assembled thereto.

The attaching clip 30, made of suitable resilient material such as spring steel, as bent seen in FIGS. 1, 2, 4 and 5, includes a base portion 31, an upturned end portion 32 that includes end portion 33 and a web 34 interconnecting the end portion 33 to base portion 31 in spaced apart relationship to each other and, a slotted return bent portion 35 positioned to overlay base portion 31 in a predetermined spaced apart relationship thereto.

The base portion 31 is of a width less than the width of aperture 12 in support panel 11 but greater then the width of slot 14 whereby this base portion is adapted for passage through the aperture 12 but not through the slot 14.

Base portion 31 is provided intermediate its ends with a suitable aperture 36 of a predetermined size and shape so as to receive the shoulder 23 of bolt 20 in a manner whereby the bolt is suitably held so as to be non-rotatable relative to the attaching clip 30. As seen in FIGS. 1 and 2, the bolt 20 is suitably secured to the base portion 31 of the attaching clip 30, for example, as by having the base portion 31 surrounding the aperture 36 sandwiched between the bearing face of the bolt head 21 and the stop members 24. Stop members 24 are formed as by swaging the free end corners of the shoulder 23 to effect attachment of the bolt 20 to the attaching clip 30. It will be apparent, however, that other suitable means can be used to secure the bolt to the attaching clip.

Preferably, as shown, the free end of base portion 31 is also provided with a downturned leading edge 37 whereby to provide a cam surface to facilitate the assembly of the attaching clip to the support panel 11 in a manner to be described.

The end portion 33 of the attaching clip 30 is of a predetermined length, as desired, greater than the longitudinal length of aperture 12 so that a free end portion of the end portion 33 will abut against the surface 16 of the support panel 11 adjacent to the aperture 12 when the attaching clip 10 is in the installed position thereon as shown in FIG. 1. The end portion 33, at a location closely adjacent to its free end, is suitably pierced, as in the arcuate shape shown and deformed so as to provide a depending tab 38 that is thus located whereby it is adapted to snap into the aperture 12 and abut against the panel edge 17 at a location substantially opposite slot 14 when the attaching clip 30 is installed to the support panel, as shown in FIG. 1.

The return bent portion 35 is provided with a longitudinal slot 40 that extends from the attached end of the return bent portion 35 to a location, preferably, closely adjacent to its free end so as to extend beyond the bolt 20 as shown in FIGS. 1 and 2. The return bent portion 35, as best seen in FIG. 1, is of a suitable width and longitudinal extent so as to abut against the upper surface 16 of the support panel 11 next adjacent to the slot 14. As shown, the slot 40 is thus also appropriately sized so as to permit for the free passage of the threaded shank 22 of the bolt 20 therethrough.

Referring now to FIG. 3, there is shown a sheet metal blank 50, for example of spring steel, from which the attaching clip 30 can be fabricated. In the embodiment illustrated, the blank 50 includes a rectangular first portion 51 and an integral larger, substantially rectangular second portion 52.

The portion 52 is provided with longitudinal extending, parallel spaced apart pierced openings 55 that are interconnected adjacent to the free end of portion 52 by a semi-circular pierced opening 56 whereby to, in effect, define the outer boundary of the end portion 33 and, the inner boundary of the slot 40 in the return bent portion 35 of the attaching clip 30. In addition, the portion 52 is provided with a suitable arcuate, preferably semi-circular, pierced opening 57 so as to permit the formation of the tab 38.

Portion 51 is also preferably provided while in its flat blank form with the aperture 36, of suitable configuration and size such as the square configuration shown, to receive the shoulder 23 of the bolt 20.

Fold lines 60 and 61 on the portions 51 and 52, respectively, define the opposite end margins of web 34 and, therefore, the inboard ends of the base portion 31 and end portion 33, respectively. These fold lines 60 and 61 are spaced apart a predetermined distance to correspond substantially to the maximum thickness of the support panel 11 on which the attaching clip 30 is to be used.

Figure 5:
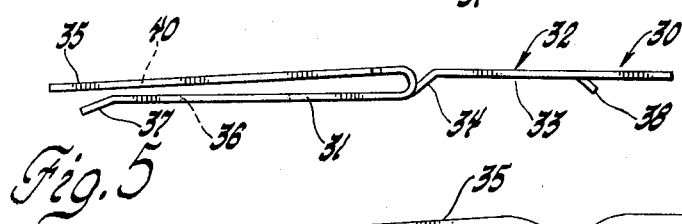
FIG. 5 is a side elevational view of the attaching clip per se of FIG. 5 in accordance with the preferred embodiment; and, FIG. 6 is an enlarged side elevational view of a portion of an attaching clip to show an alternate form of construction.
Figure 6:
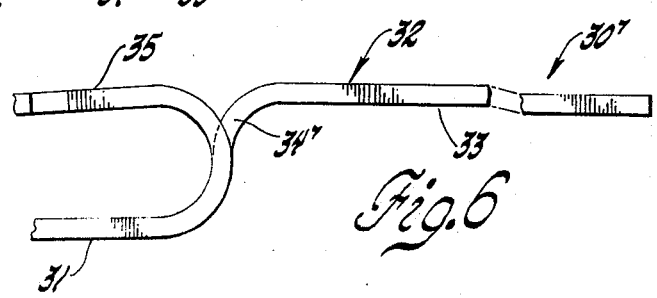

It will now be apparent that in order to fabricate the attaching clip 30 from the blank 50, the blank is folded or bent at the fold lines 60 and 61 whereby to form the web 34 and thus define the base portion 31 and the end portion 33 at opposite sides thereof. In the embodiment shown in FIGS. 1, 2, 4 and 5, the web 34 is suitably inclined, as for example at approximately a 45° angle relative to both the base portion 31 and end portion 33 whereby these portions are suitably positioned in spaced apart relationship, as desired to each other for a given panel thickness. Alternatively, as shown in FIG. 6, the connecting web 34' is formed in this alternate embodiment of the attaching clip 30' in S-shaped configuration when viewed from the side. Preferably, as best seen in FIGS. 5 and 6, the base portion 31 and end portion 33 are slightly inclined toward each other in the as formed configuration of the attaching clip for a purpose which will become apparent.

In addition, the outer segment of the portion 52, that is the segment outboard of the pierced openings 55 and 56, is folded back over the blank portion 51 so as to provide the return bent portion 35 of the attaching clip 30. Preferably, this segment defining the return bent portion 35 is bent sufficiently back over and toward the base 31 so as to also be inclined at its free end at an angle toward the base portion 31. As a result of this initial bending, the distance between the base portion 31 and return bent portion 35 at their free ends, in the as fabricated condition as best seen in FIG. 5, is less than the minimum thickness of a support panel 11 in a predetermined thickness size range of support panels 11 on which the attaching clip 30 may be used.

Thus the base portion 31 and the return bent portion 35 are initially formed so as to define a spring clip of U-shaped configuration so that upon attachment of the attaching clip 30 to a support panel 11, the free ends of the base portion 31 and of the return bent portion 35 will frictionally engage opposite surfaces, that is surface 15 and 16 of the support panel 11. In addition, since the base portion 31 and end portion 33 are inclined toward each other as fabricated, these portions will also operate to frictionally grip opposite surfaces of the support panel 11.

To assemble the fastener assembly 10 to the support panel 11, the base portion 31 of the attaching clip 30 with the bolt 20 attached therethrough is inserted through the aperture 12 (see FIG. 2), and then moved laterally, to the left with reference to FIG. 2, so that the shoulder 23 of the bolt passes into the slot 14. During the insertion of the base portion 31 into the aperture 12, the leading edge of the return bent portion 35 is caused to engage the upper surface 16 of the support panel 11 whereby to effect spaced displacement of this return bent portion 35 relative to the base portion 31 so as to permit movement of the fastener assembly to the position shown in FIG. 1 at which the shank of the bolt 20 is located closely adjacent to the panel edge 18 at the end of the slot 14 in the support panel 11. As the fastener assembly 10 is thus moved to the position shown in FIG. 1, the tab 38 will snap into the aperture 12 and then abut at its free end against the panel edge 17.

The spring clip arrangement, provided by the base portion 31 and return bent portion 35, and the biasing forces applied by the base portion 31 and end portion 33 are operative to firmly retain the fastener assembly 10 to the support panel 11, while at the same time permitting the attaching clip 30 thereof to be used with a wider range of support panel thicknesses. This of course permits a reduction in the number of parts required for use as blind fastener assemblies for a relatively large range of support panel thickness.

In addition, by having the base portion 31 of the attaching clip 30 disposed between the head 21 of bolt 20 and the bottom surface 15 of the support panel, the effective bearing surface of the bolt head 21 relative to the support panel 11 is substantially increased.

The embodiments of the invention in which an exclusive property or privilege is claimed are defined as follows:

1. A fastener assembly for use with a support panel having an opening therethrough and a slot extending from the opening, said fastener assembly including a bolt and an attaching clip, said bolt having a threaded shank with a head on one end thereof, said head being wider than the slot; said attaching clip of resilient material including a base portion of a size to pass through the opening and wider than the slot for abutment against one side of the support panel adjacent to the slot, an upturned end portion for positioning on the opposite side of the panel and having a tab extending therefrom for abutting relation with the edge of the support panel defining the opening at a location opposite the slot, and a return bent portion, having a slot aperture therein extending over said base portion for abutment with the opposite side of the panel from said base portion, said base portion having an aperture therethrough aligned with said slot aperture; said bolt being positioned to have said threaded shank thereof extending through said aperture and said slot aperture whereby said head is positioned to abut against said base portion on the side thereof opposite said return bent portion.

2. A fastener assembly for use with a support panel having an opening therethrough and a slot extending from the opening, said fastener assembly including a bolt and an attaching clip, said bolt having a head with a shank extending therefrom, said shank including a threaded free end shank portion and an enlarged polygonal shoulder portion next adjacent to said head, said head being wider then the slot; said attaching clip including a base portion of a size to pass through the opening and wider than the slot for abutment against one side of the support panel adjacent to the slot, a web connecting said base portion to an upturned end portion adapted to engage the opposite side of the panel and having a depending tab for abutting relation with the edge of the support panel defining the opening at a location opposite the slot, and an apertured return bent portion extending over said base portion for abutment with the opposite side of the panel from said base portion; said base portion having an aperture therethrough receiving said polygonal shoulder portion of said bolt to prevent rotation thereof; said bolt being positioned with its head on the side of said base portion opposite said apertured return bent portion so as to have said threaded shank extending through said aperture and through said apertured return bent portion.

* * * * *